(12) United States Patent
Hardouin et al.

(10) Patent No.: US 8,883,004 B2
(45) Date of Patent: Nov. 11, 2014

(54) FILTER ASSEMBLY

(75) Inventors: Ghislain Hardouin, Sambin (FR); Patrick Daniel, Blois (FR)

(73) Assignee: Delphi International Operations Luxembourg S.A.R.L., Luxembourg (LU)

(*) Notice: Subject to any disclaimer, the term of this patent is extended or adjusted under 35 U.S.C. 154(b) by 287 days.

(21) Appl. No.: 13/262,352

(22) PCT Filed: Apr. 6, 2010

(86) PCT No.: PCT/EP2010/054528
§ 371 (c)(1), (2), (4) Date: Nov. 28, 2011

(87) PCT Pub. No.: WO2010/115887
PCT Pub. Date: Oct. 14, 2010

(65) Prior Publication Data
US 2012/0103884 A1    May 3, 2012

(30) Foreign Application Priority Data

Apr. 3, 2009  (EP) .................................... 09157279

(51) Int. Cl.
| | |
|---|---|
| *B01D 35/18* | (2006.01) |
| *B01D 29/13* | (2006.01) |
| *B01D 35/30* | (2006.01) |
| *B01D 27/08* | (2006.01) |
| *B01D 36/00* | (2006.01) |
| *B01D 29/15* | (2006.01) |

(52) U.S. Cl.
CPC .......... *B01D 35/18* (2013.01); *B01D 2201/295* (2013.01); *B01D 27/08* (2013.01); *B01D 36/006* (2013.01); *B01D 2201/0415* (2013.01)
USPC ........... 210/232; 210/175; 210/184; 210/236; 210/435; 210/437; 210/438; 210/440; 210/443; 210/450; 210/451; 210/453; 210/455

(58) Field of Classification Search
None
See application file for complete search history.

(56) References Cited

U.S. PATENT DOCUMENTS

| | | | |
|---|---|---|---|
| 4,510,051 A | * | 4/1985 | Diry ............................... 210/94 |
| 6,402,943 B1 | | 6/2002 | Bohlender |
| 2010/0155318 A1 | | 6/2010 | Lika |

FOREIGN PATENT DOCUMENTS

| | | | | |
|---|---|---|---|---|
| BE | 637 745 | | 9/2006 | |
| DE | 10 2006 060129 | | 6/2008 | |
| EP | 0 045 707 | | 2/1982 | |
| EP | 1 036 930 | | 9/2000 | |
| EP | 1 702 662 | * | 9/2006 | ............ B01D 29/60 |
| FR | 2 177 159 | | 11/1973 | |
| FR | 2 549 148 | | 1/1985 | |
| GB | 2 031 296 | | 4/1980 | |
| WO | 2005/049173 | | 6/2005 | |

* cited by examiner

*Primary Examiner* — Benjamin Kurtz
(74) *Attorney, Agent, or Firm* — Thomas N. Twomey

(57) ABSTRACT

A filter assembly includes a disposable filter body and a central support for the disposable filter body. Openings are provided in upper and lower ends of the disposable filter body for receiving a respective end of the central support. The filter assembly also includes a disposable filter cartridge, housed within the disposable filter body, and housing a filter member for filtering particulate contaminates from a flow of fluid through the filter assembly. The filter member is hollow and the disposable filter cartridge also includes an impermeable wall that extends axially through the filter member. The central support is separable from the disposable filter body and removable from the openings to allow disposal and replacement of the filter body and the filter cartridge during servicing.

16 Claims, 5 Drawing Sheets

FILTER ASSEMBLY

TECHNICAL FIELD

This invention relates to a filter assembly. In particular, but not exclusively, the invention relates a filter assembly for cleaning fuel in a fuel system of a compression ignition internal combustion engine.

BACKGROUND TO THE INVENTION

A fuel filter of a fuel system of an internal combustion engine is used to remove contaminates from the flow of fuel, thereby avoiding the transmission of the contaminates to, for example, the high pressure fuel pump or the injectors of the fuel system. Unfiltered fuel can contain particulate contaminates, such as dirt or rust, or fluidic contaminates, such as moisture from the fuel tank of the fuel system. The transmission of such contaminates may result in increased wear rates for the components of the fuel system and a less efficient fuel burn.

A typical filter assembly comprises a filter head including ports that connect the filter assembly to the fuel system, and a filter can secured to the filter head. The filter can contain a filter medium. The filter medium forms part of a filter cartridge located within the filter can. Optionally, the filter assembly can also include a water storage capacity or decantation volume for storing the fluidic contaminates once they have been filtered out of the fuel flow.

Filter servicing is necessary either when the filter medium becomes obstructed by the accumulation of the particulate contaminates and needs to be replaced, and/or when the water storage capacity is full. When servicing the filter medium, either the filter cartridge alone is replaced or the entire filter assembly. The former type of filter is known as a 'removable cartridge filter', and the latter is known as a 'throw-away filter'.

The cost of replacement parts of a removable cartridge filter is lower when compared to a throw-away filter because only the removable filter cartridge is replaced. However, a throw-away filter benefits from lower service labour cost due to the ease with which it is replaced.

Furthermore, when servicing a removable cartridge filter, unless means are provided to protect the clean side of the filter medium, the filter medium will be subject to the possibility of contamination. For example, if a removable filter is constructed so that fuel flows across the filter medium in a radially outwards direction from an inner dirty side to an outer clean side of the filter medium, the clean side of the filter medium will be exposed to the possibility of contamination when being handled during servicing. Conversely, if the fuel flows across the filter medium in a radially inwards direction from an outer dirty side to an inner clean side of the filter medium, the clean side of the filter medium will be subject to the possibility of contamination if the cartridge is handled at upper and lower ends of the filter medium. In both of these configurations, unless measures are taking to protect the clean side of the filter medium, the clean side's proximity to an outlet of the removable cartridge filer will also expose it to possible contamination.

Whereas, as a throw-away filter is supplied "ready-to-fit", the filter cartridge itself is not handled during maintenance and, therefore, is not subject to the possibility of contamination.

A further issue with some conventional filter assemblies relates to the use of a heater, the heater being arranged to heat the fuel to prevent the formation of wax particles in the fuel prior to filtration, for example. The heat transfer capacity of the heater of a conventional filter assembly is limited by its relatively small heat exchange surface area. In addition, typically the heater is fixed on the periphery of the filter assembly which increases the overall size of the filter assembly and impacts on the limited space available in the engine compartment.

A further issue with conventional filter assemblies relates to the proximity of the fuel flow to the fluidic contaminates in the decantation volume. For example, if the fuel flows into a heater at the top of the filter assembly and exits the heater into a decantation volume at the bottom of the filter assembly, the fluidic contaminates in the decantation volume become disturbed and entrained into the fuel flow.

It would be desirable to provide a fuel filter that overcomes or at least alleviates at least one of the above-mentioned problems and disadvantages in the prior art.

SUMMARY OF THE INVENTION

Thus, in accordance with a first aspect of the present invention there is provided a filter assembly comprising a disposable filter body, a central support for the disposable filter body, an opening provided in each of upper and lower ends of the disposable filter body for receiving a respective end of the central support, and a disposable filter cartridge, housed within the filter body and housing a filter member for filtering contaminates from a flow of fluid through the filter assembly. The central support is separable from the disposable filter body and removable from the openings to allow disposal and replacement of the filter body and the filter cartridge during servicing. The upper end (or top side) of the disposable filter body may be defined by a filter cover (or head), and the lower end of the filter body may be defined by a filter bowl. In an assembled state the central support extends through the opening of the filter bowl and the opening of the filter cover. In this way, the central support provides rigidity to the filter assembly and helps to maintain the filter cover and filter bowl in a desired relationship. To disassemble the filter assembly, the central support is removed from the openings of the disposable filter body and the filter body and the filter cartridge can be removed from the central support. Advantageously, the central support is slidingly received in the openings of the disposable filter body, so that the filter body and filter cartridge can be removed in unitary fashion by sliding the filter body along and off the central support.

Typically, the filter cover is substantially disc- (or plate-) shaped and the filter bowl may be substantially bucket-shaped, having a base and a cylindrical side wall. The top edge of the side wall of the filter bowl is connected to (or sealed against) the filter cover, in use.

The convenient disposal of an old filter body and replacement of a new filter body ensures that the present invention benefits from an uncomplicated servicing procedure when compared to a conventional removable cartridge filter.

Preferably, the central support is provided with a series of integral heating elements which serve to heat the fluid flow prior to passage through the filter member.

If the fluid is a fuel, it may be subject to the formation of wax particles, under certain atmospheric conditions. Any wax particles carried in the fuel flow would quickly obstruct the filter member as the fuel flows through the filter assembly. Heating the fuel prevents the formation of wax particles. Accordingly, the series of integral heating elements are used to heat the fuel flow prior to it passing through the filter member, thereby increasing the operational life of the filter member. Alternatively, if the fluid is a urea solution, the series of integral heating elements serve to de-ice the solution.

The filter member is preferably a hollow cylinder and the disposable filter cartridge further comprises an impermeable wall that extends axially through the filter member.

The impermeable wall protects the filter member of the disposable filter body from the possibility of contamination before servicing, for example, when the disposable filter body is "on-the-shelf" ready to be used, and during servicing when the central support is placed into a new disposable filter body. The impermeable wall ensures that contaminates which may otherwise contact a clean filter member as it is replaced are isolated from the clean side of the filter assembly. The impermeable wall also serves to act as a guide when inserting the central support into the disposable filter body, thereby making the servicing of the filter assembly easier.

In a suitable embodiment, the central support comprises an elongate stem that is adapted to be received within at least one of the openings in the filter cover and filter bowl, and an enlarged head having a diameter larger than the openings. In an assembled state the enlarged head of the central support is located outside of the filter body and may be in an abutting relationship with either the filter cover or filter bowl. This arrangement can avoid the need to securely engage (e.g. by a screw-thread or other means of attachment) the enlarged head region of the central support to the filter body, and thus can simplify assembly and disassembly of the filter assembly. In such arrangements, to disassemble the filter assembly, the disposable filter body and the disposable filter cartridge may be collectively slid along the elongate stem of the central support in the direction away from the enlarged head to be separated from the central support. The stem is typically cylindrical in cross-section. It can be convenient for the enlarged head of the central support to house electrical connections or other devices of the filter assembly.

The central support may comprise a hollow interior which forms part of a flow passage for fluid through the filter assembly. The hollow interior of the central support may typically comprise a wall which divides the hollow interior into a first chamber and a second chamber which define a flow passage through the filter assembly. Thus, the flow passage through the central support conveniently comprises two parallel chambers (or portions) for the anti-parallel flow of fluid through the central support. Accordingly, the two chambers of the central support may be considered to be anti-parallel flow passages. Preferably, the wall comprises a pair of heat exchange plates. The first and second chambers are preferably in communication with one another at their lower ends. Suitably, the top and bottom ends of the central support are closed to isolate fluid on the inside of the central support from fluid within the filter body outside of the central support.

Preferably, the configuration of the central support is such that the fluid enters the first chamber towards an upper end of the central support and exits the second chamber towards the upper end of the central support prior to passage through the filter member.

Preferably, a decantation volume for collecting water is located at the lower end of the disposable filter body (i.e. in the bottom of the filter bowl). This arrangement ensures that the fluid is isolated during transit through the central support and therefore is not exposed to contaminates in the decantation volume. This removes the possibility of the contaminates being entrained into the fluid flow.

Advantageously, to aid in assembly and disassembly of the filter assembly, the central support is securely coupled to the filter body at only one end (e.g. where the central support has an enlarged head, the secure coupling may be located at the opposite end to the enlarged head).

It is convenient for the central support to be secured to the disposable filter body by a locking means located, at least partially, within one of the openings. The locking means suitably comprises a part in screw-threaded engagement with the central support. The locking means (or the part of the locking means in screw-threaded engagement with the central support) includes a region that extends through one of the openings in the filter body to abut an outer surface of the filter body.

The locking means is beneficially the only fixing part of the filter assembly that needs to be removed during servicing of the filter assembly, thereby facilitating a simple removal of the central support from the old disposable filter body and a simple placement of the central support in a new disposable filter body. Typically, the central support comprises an enlarged head at its end remote from the locking means, wherein the enlarged head projects through one of the openings so that the underside thereof abuts the disposable filter body. As already mentioned, the enlarged head of the central support removes the need to secure in position the end of the central support opposite from the locking means. With the need to securely couple the central support to the disposable filter body at both ends removed, there is no need for other threaded features on the filter body and therefore the complexity of the components, and therefore the cost of their manufacture (particularly the disposable components) can be reduced.

Typically, the filter cover is further provided with an inlet opening and an outlet opening for allowing fluid to enter and exit the filter body. The disposable filter cartridge may conveniently comprise an inlet port arranged, in an assembled state, to align with the inlet opening of the filter cover, and an outlet port arranged to align with the outlet opening of the filter cover for connecting to a fuel line or pipe for transferring fuel to or from, respectively, the filter assembly. The filter assembly may further comprise an inlet pipe received in the inlet port and connected to the inlet opening of the filter head to provide a fluid flow path into the filter cartridge, and an outlet pipe received in the outlet port and connected to the outlet opening of the filter head to provide a fluid flow path out of the filter cartridge. Thus, the central support may be provided with a first radial opening towards its upper end to allow fluid communication between the inlet pipe and the interior of the central support, and a second radial opening towards its upper end to allow fluid communication between the interior of the central support and an inner volume of the filter body. When the central support comprises an enlarged head in an assembled state to be located in abutting relationship with the filter cover, the radial distance from the central axis of the central support to the radially outermost side of the enlarged head is less that the radial distance from the central axis of the central support to the radially innermost edge of the inlet opening and outlet opening in the filter cover. This is to ensure that the enlarged head does not interfere with the inlet and outlet of the filter assembly.

Conveniently, the filter member is a radial filter, which is arranged for the radial flow of fluid.

In accordance with a second aspect of the invention there is provided a filter assembly comprising a filter body, a central support for the filter body, an opening provided in each of upper and lower ends of the filter body, for receiving a respective end of the central support, and a disposable filter cartridge, adapted to be housed within the filter body. The filter cartridge is arranged for receiving/housing a filter member in the form of a hollow cylinder for filtering particulate contaminates from a flow of fluid through the filter assembly. The disposable filter cartridge further comprises an impermeable wall that extends axially through the filter member to protect a clean side of the filter member during replacement of the disposable filter cartridge. The filter member is beneficially arranged for fluid flow in a radial direction from a first side of the filter member to a second side of the filter member. In this arrangement, the impermeable wall that extends axially through the filter member is arranged to be adjacent the second side of the filter member. In this way, the impermeable wall protects the second or "clean" side of the filter member during storage and/or replacement of the disposable filter cartridge. In some embodiments, therefore, the filter assembly in this aspect comprises a radial filter member as described herein.

As noted, the impermeable wall protects the filter member of the filter cartridge from the possibility of contamination before servicing, for example, when the filter body is "on-the-shelf" ready to be used, and during servicing, when the central support is placed into a new filter body. The impermeable wall ensures that contaminates which may otherwise contact a clean filter member as it is replaced are isolated from the clean side of the filter assembly. In a filter assembly of the invention, typically the first (or "dirty") side of the filter member defines the outer surface of the hollow cylinder of the filter member, and the second (or "clean") side defines the inner surface of the hollow cylinder of the filter member.

The impermeable wall is conveniently axially aligned with the openings provided in the upper and lower ends of the filter body and thereby serve to act as a guide when inserting the central support into the filter body, thereby making the servicing of the filter assembly easier.

Beneficially, the filter body is also disposable. In this second aspect of the invention, the filter body may be as defined in accordance with the first aspect of the invention. Similarly, the filter cartridge in this second aspect may be as defined in accordance with the first aspect of the invention.

In accordance with a third aspect of the invention, there is provided a disposable radial filter cartridge as described in relation to the first and/or second aspects of the invention and elsewhere herein.

In accordance with a fourth aspect of the invention there is provided a filter assembly comprising a filter body, a central support for the filter body, an opening provided in each of upper and lower ends of the filter body, for receiving a respective end of the central support, and a filter cartridge, housed within the filter body, and housing a filter member for filtering particulate contaminates from a flow of fluid through the filter assembly. The central support is provided with a series of integral heating elements which serve to provide a heating effect to the fluid flow, prior to passage through the filter member.

If the fluid is a fuel, it may be subject to the formation of wax particles, under certain atmospheric conditions. Any wax particles carried in the fuel flow would quickly obstruct the filter member as the fuel flows through the filter assembly. Heating the fuel prevents the formation of wax particles. Alternatively, if the fluid is a urea solution, the series of integral heating elements serve to de-ice the solution.

The central support may comprise a hollow interior which forms part of a flow passage through the filter assembly.

The hollow interior of the central support may comprise a wall, preferably comprising a pair of heat exchange plates, which divides the hollow interior into a first chamber and a second chamber which define anti-parallel portions of the flow passage through the filter assembly.

Preferably, the first and second chambers are in communication with one another at their lower ends. Fluid enters and exits the central support through radial openings at the upper end of the central support. The manner in which the heat exchange plates are positioned in the central support is such that fluid enters from one radial opening in the central support and then flows along the length of the central support to the bottom of the first and second chambers. The fluid then flows to the top of the second chamber and exits the central support from the other radial opening. The presence of the heat exchange plate therefore increases the flow passage length through the filter assembly without compromising on the size of the filter assembly.

The heating elements are conveniently positioned between the heat exchange plates, or in other words, contained within the wall.

In an alternative arrangement, the hollow interior of the central support may comprise a wall in the form of a single heat exchange plate.

In this alternative arrangement, the heating elements are conveniently positioned on one side or the other of the heat exchange plate.

This arrangement provides a compact filter assembly by removing the need to fix an external heating element to the filter assembly, whilst retaining a significant heat exchange surface area due to the flow passage through the central support.

By "impermeable", as used herein in the context of the "impermeable wall" of the filter member, it is meant, that the wall is essentially (or completely) impermeable to solid particles, and/or liquids, and/or gases. In particular, the impermeable wall is impermeable (or essentially impermeable) to liquids and solid particles that might otherwise contaminate the filter member. Furthermore, the impermeable wall is not reactive or dissolvable with the fluid(s) that is/are intended to be passed through the filter assembly of the invention. For example, a suitable material for the impermeable wall is a solid polymer or metal. The impermeable wall is conveniently formed of the same material as the rest of the filter cartridge and/or the filter body.

It will be appreciated that preferred and/or optional features of the first, second, third and fourth aspects of the invention may be incorporated into the other aspects of the invention also, alone or in appropriate combination.

BRIEF DESCRIPTION OF THE FIGURES

The invention will now be described, by way of example only, with reference to the accompanying drawings, in which.

A filter assembly of an embodiment of the invention generally has three aspects:
 i) a filter body;
 ii) a central support for the assembly; and,
 iii) a filter cartridge having a filter medium.

Figure 1:
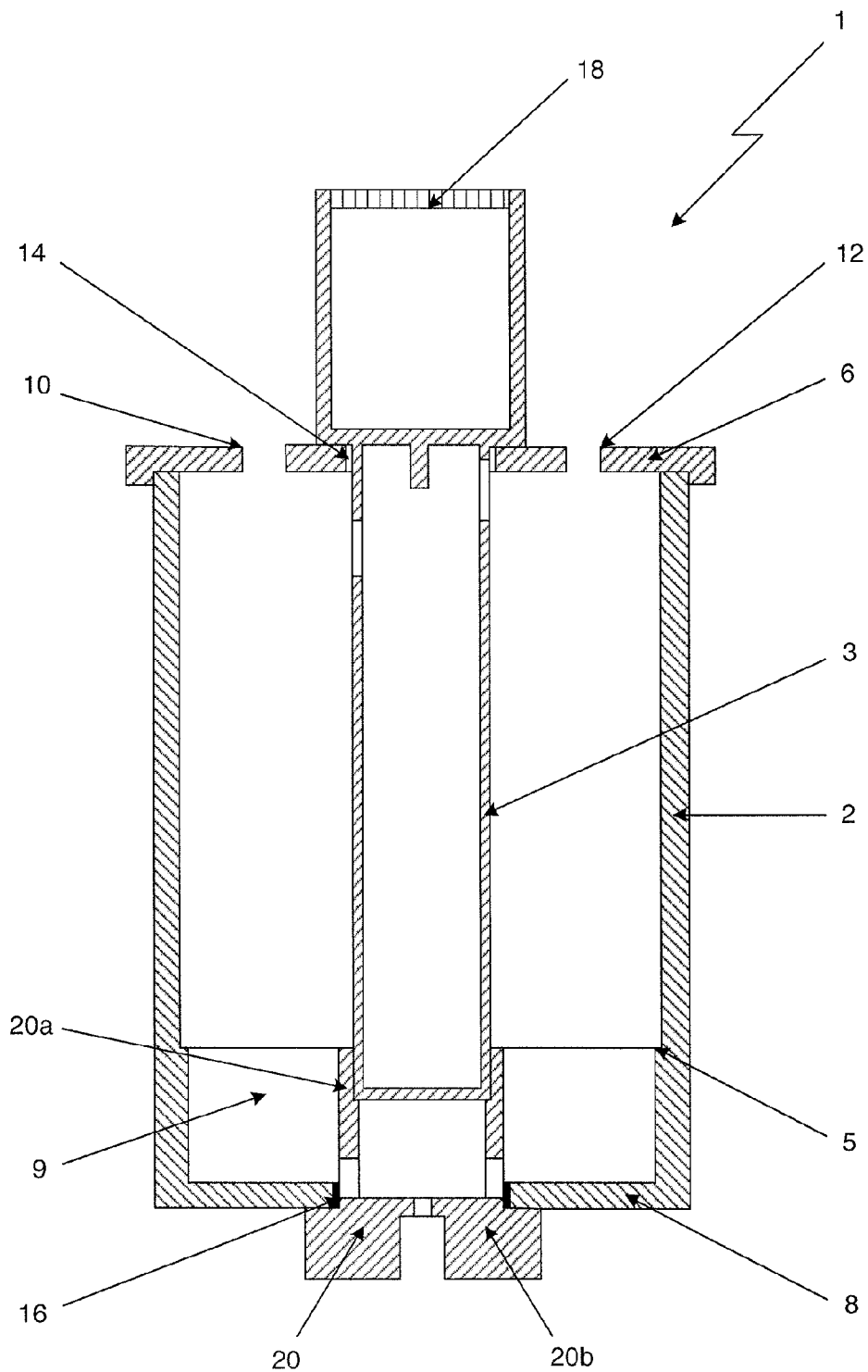
FIG. 1 is a cut-away view of a filter assembly of a first embodiment of the invention with a filter cartridge of the assembly removed.

With reference to FIG. 1, the filter assembly 1 comprises a generally cylindrical central support 3 (referred to as the central support) positioned along the centreline of a generally cylindrical filter body 2 (referred to as the filter body). The cross-sectional area of the filter body 2 is stepped along its length to create a shoulder 5 towards its lower end. The upper and lower ends of the filter body 2 carry a filter cover (or head or lid) 6 and a filter bowl 8 respectively. The filter bowl 8 houses the filter components of the filter assembly 1. Typically, the filter cover 6 is sealed to the filter body 2 during manufacture. A decantation volume 9 for collecting water is defined by the inner surface of the filter body 2 in the lower or base region of the filter body 2 between the shoulder 5 and the base of the filter bowl 8.

In the illustrated embodiment, the filter cover 6 is provided with three integral openings; an inlet opening 10, an outlet opening 12, and a central opening 14. The inlet and outlet openings 10, 12 are radially outward of the centre of the filter cover 6. The filter bowl 8 is provided with only a central opening 16. The central openings 14, 16 of the filter cover 6 and the filter bowl 8 are axially aligned with each other and are arranged to receive a respective end of the central support 3. An enlarged head 18 of the central support 3 projects through the central opening 14 in the filter cover 6 so that its underside abuts the upper surface of the filter cover 6. The lower end of the central support 3 extends towards the central opening 16 in the filter bowl 8 and is secured in position by a locking member 20 received, in part, within the opening 16. The locking member 20 includes a screw-threaded part in the form of an upwardly-standing tubular portion 20a carrying a screw thread on its internal surface and a head portion 20b located on the outside of the filter bowl 8 so as to be accessible during servicing. The tubular portion 20a projects through the central opening 16 in the filter bowl 8 and is fastened to the external surface of the lower end of the central support 3 by means of screw threaded engagement. It will be appreciated that in other embodiments, the central support 3 can be secured in position by an alternative locking means. For example, the screw thread may be on the internal surface of the central support 3 and the external surface of the locking member 20.

Figure 2:
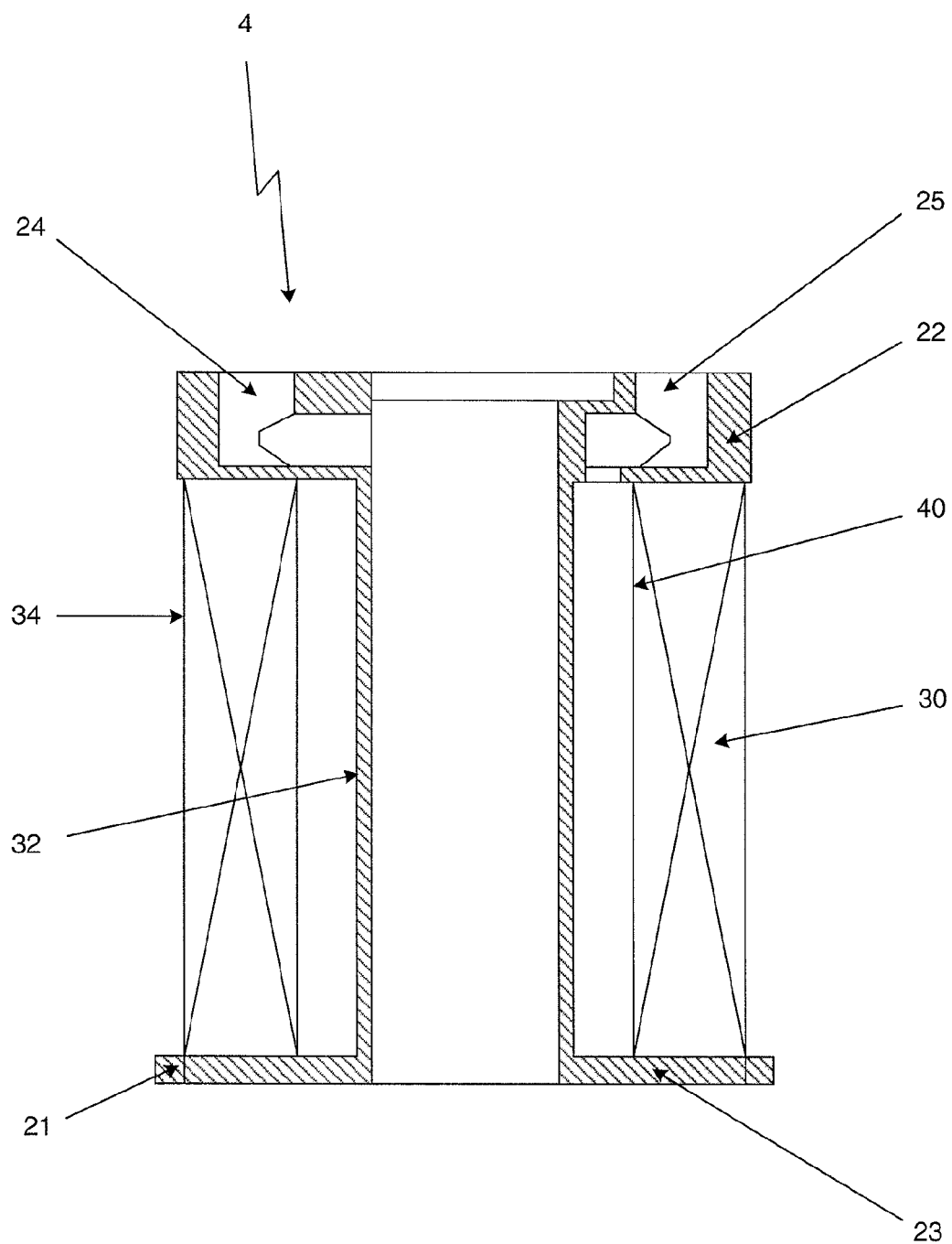
FIG. 2 is a cut-away view of a filter cartridge for use in the filter assembly of FIG. 1.
Figure 3:
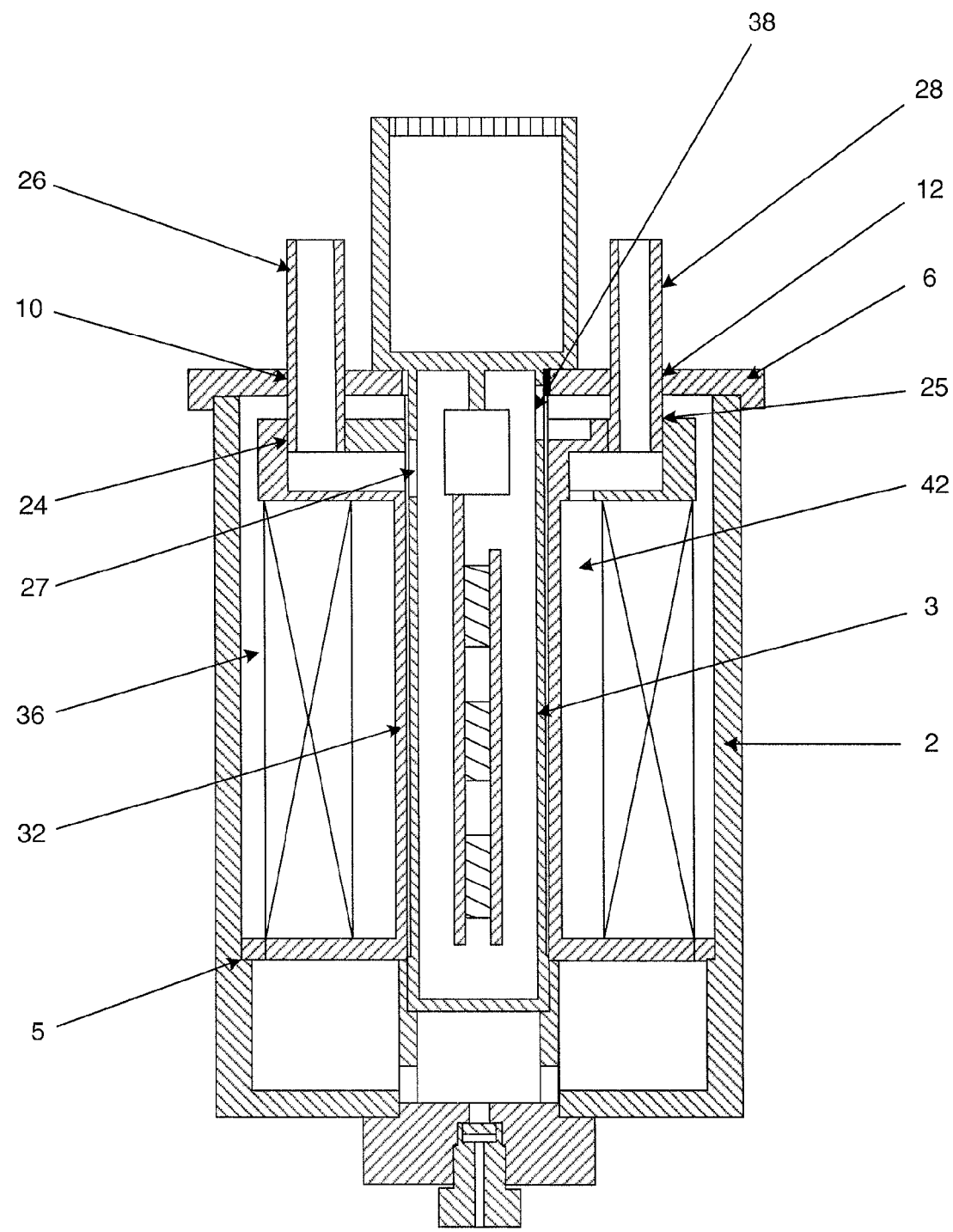
FIG. 3 is a cut-away view of the filter assembly of FIG. 1, with the filter cartridge of FIG. 2 in situ.

With reference to FIGS. 2 and 3, the filter body 2 and the central support 3 define an annular volume between them within which a filter cartridge 4 is located and supported. At its lower end, the filer cartridge 4 carries a series of projections 21 which rest on the shoulder 5 of the filter body 2 to locate the cartridge 4 in position. The filter cartridge 4 comprises an upper part 22 and a lower part 23 between which a generally cylindrical hydrophobic filter medium 30 (referred to as the filter medium) is located. An inlet port 24 and an outlet port 25 are provided in the upper part 22 of the filter cartridge 4. The inlet and outlet ports 24, 25 are designed for connection to a fuel line or pipe for transferring fuel to or from, respectively, the filter assembly 1. The inlet port 24 of the filter cartridge 4 is arranged to align with the inlet opening 10 of the filter cover 6 and is connected to an inlet pipe 26 which communicates with, for example, a low-pressure transfer pump (not shown). The inlet pipe 26 is received within the inlet port 24 by means of a press fitting and is securely fixed in the inlet opening 10 of the filter cover 6 during manufacture by way of, for example, a braze weld. The inlet pipe 26 is arranged to communicate with the interior of the central support 3 by way of a first radial opening 27 provided in the central support 3 towards its upper end. Similarly, the outlet port 25 is arranged to align with the outlet opening 12 of the filter cover 6 and is connected to an outlet pipe 28 which communicates with, for example, the inlet of a high pressure fuel pump (not shown). The outlet pipe 28 is secured to the outlet port 25 of the filter cartridge 4 using a press fitting and is fixed in the outlet opening 12 of the filter cover 6 during manufacture.

The filter medium 30 is used to filter particulate contaminates from the fuel flow. The upper and lower surfaces of the filter medium 30 are bonded to the internal surfaces of the upper and lower parts 22, 23 of the filter cartridge 4 respectively. An impermeable wall 32 extends through the filter medium 30, along its central axis, and is fixed to the upper and lower parts 22, 23 of the filter cartridge 4 at its upper and lower ends, respectively. The position of the impermeable wall 32 is such that it is axially aligned with the openings 14, 16 in the upper and lower ends 6, 8 of the filter body 2.

An outer (or first) side 34 (referred to as the "dirty" side) of the filter medium 30 and the inner surface of the filter body 2 together define a first annular volume 36. The first annular volume 36 is in communication with the interior of the central support 3 by way of a second radial opening 38 in the central support 3 located towards its upper end and closer to the upper end than the first radial opening 27. An inner (or second) side 40 (referred to as the "clean" side) of the filter medium 30 and the impermeable wall 32 of the filter cartridge 4 together define a second annular volume 42, radially inward of the first annular volume 36. The second annular volume 42 is in communication with the outlet port 25 of the filter cartridge 4. The manner in which the filter medium 30 is bonded to the upper and lower parts 22, 23 of the filter cartridge 4 is such that fuel can only flow from the first annular volume 36 (the dirty side 34 of the filter medium 30) to the second annular volume 42 (the clean side 40 of the filter medium 30) in a radially inward direction through the filter medium 30.

Figure 4:
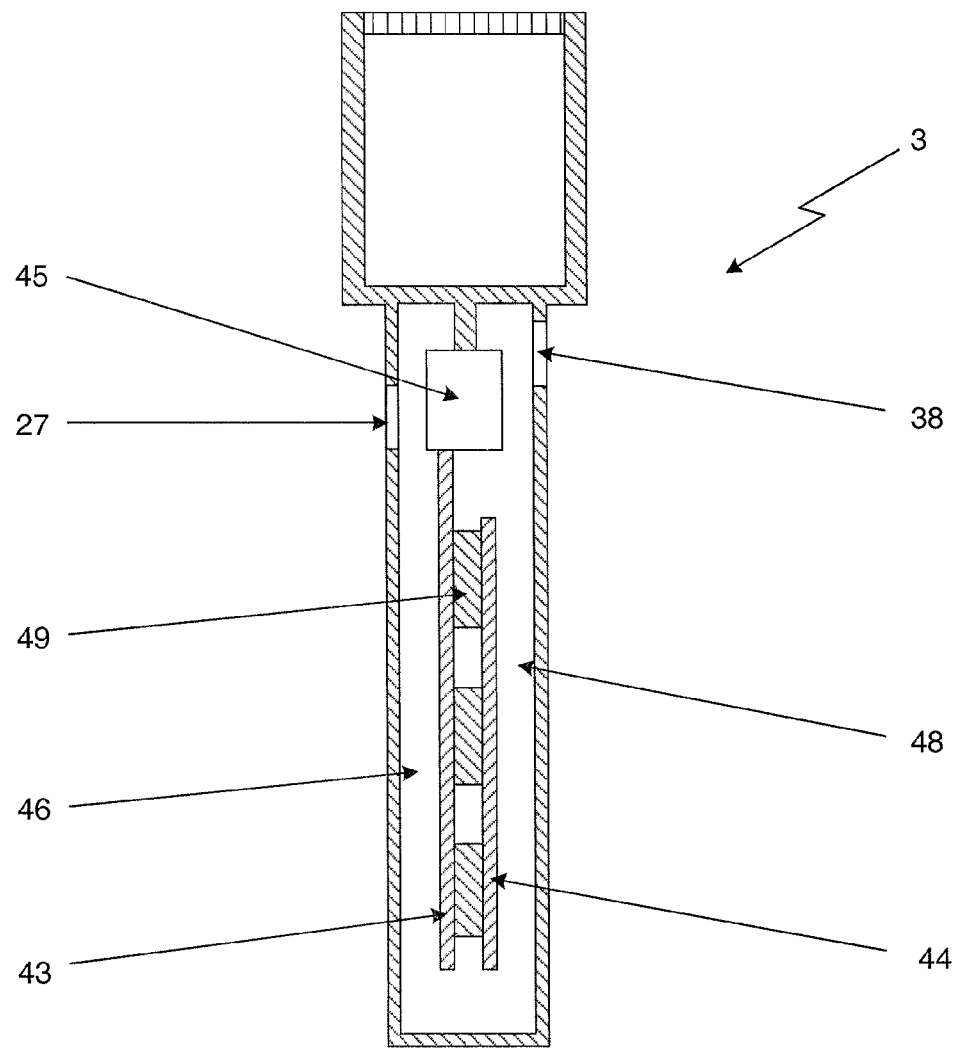
FIG. 4 is a sectional view of a central support of the filter assembly in FIGS. 1 and 3; and, FIG. 5 is a sectional view of the filter assembly in FIGS. 1 and 3 illustrating the flow passage for fluid through the assembly, in use.

With reference to FIG. 4, the interior of the central support 3 is provided with a wall in the form of two heat exchange plates 43, 44 which serve to divide the interior into first and second chambers 46, 48. The first and second chambers 46, 48 are in communication with one another at their lower ends. A series of integral heating elements 49 are located between and spaced along the heat exchange plates 43, 44. One of the heat exchange plates 44 is connected to a thermostatic switch 45 by an electric connection (not shown).

In another embodiment (not shown), the wall may comprise a single heat exchange plate located along the centre line of the interior of the central support 3 and having a series of integral heating elements located along one of its sides.

Figure 5:
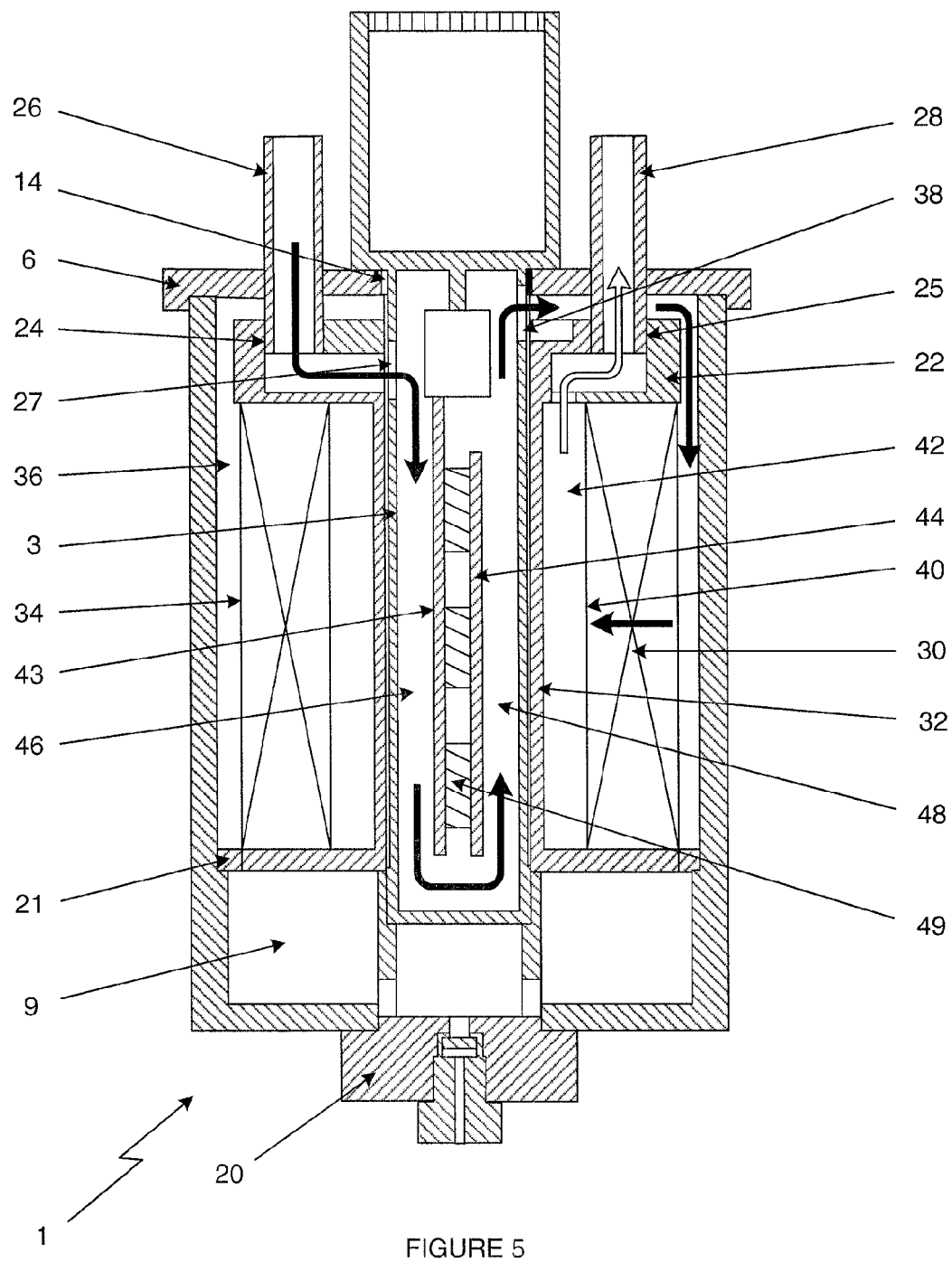

With reference to FIG. 5, in use, with the inlet and outlet pipes 26, 28 connected to the appropriate fuel lines, operation of the low-pressure transfer pump located upstream of the filter assembly 1 will result in fuel being pumped into the inlet port 24, through the first radial opening 27 in the central support 3 and, hence, into the central support 3. The manner in which the heat exchange plates 43, 44 are positioned in the central support 3 is such that fuel can only flow from the first radial opening 27 in the central support 3, along the length of the central support 3 to the bottom of the first and second chambers 46, 48, as indicated by the arrows in FIG. 5. The fuel then flows to the top of the second chamber 48, exits the central support 3 from the second radial opening 38 and flows into the first annular volume 36. From the first annular volume 36, some of the fuel flows between the projections 21 into the decantation volume 9. Once the capacity of the decantation volume 9 is used, the fuel flows in a radially inward direction through the filter medium 30.

The heat exchange plates 43, 44 therefore increase the fuel passage through the filter assembly 1 and make a significant heat exchange surface area available within the central support 3, thereby providing ample heat exchange from the integral heating elements 49 to the fuel flow.

The heating elements 49 heat the fuel on transit through the central support 3 to the first annular volume 36. If the temperature of the fuel in the low-pressure transfer pump is relatively low, as would occur upon initial engine start-up under certain atmospheric conditions, the fuel may be subject to the formation of wax particles which may cause blockage of the filter medium 30. Heating the fuel reduces the formation of the wax particles in the fuel and, hence, reduces the possibility of the filter medium 30 becoming blocked. The heat exchange surface area of the heat exchange plates 43, 44 ensures that the fuel flow is sufficiently heated during transit through the central support 3. This arrangement provides a compact filter assembly when compared with conventional fuel filters by removing the need to fix an external heating element to the filter assembly 1, thereby saving limited space in the engine compartment.

The filter medium 30 is used to collect the particulate contaminates as the fuel flows in a radially inward direction from the first annular volume 36, through the filter medium 30 into the second annular volume 42. The provision of the filter medium 30, positioned between the first and second annular volumes 36, 42, prevents any particulate contaminates in the fuel flow from exiting the clean side 40 of the filter medium 30 and, in so doing, ensures that no particulate contaminates are transmitted downstream of the filter assembly 1.

A compression ignition internal combustion engine relies on the fuel for lubrication. If the lubricating fuel contains fluidic contaminates such as water, the moving parts of the engine would be likely to overheat. Therefore, in addition to removing the particulate contaminates from the fuel flow, it is also considered desirable for the filer assembly 1 to remove any water present in the fuel flow.

The filter medium 30 extracts the water from the fuel as the fuel flows from the first annular volume 36 to the clean side 40 of the filter medium 30. From the clean side 40 of the filter medium, the filtered fuel flows into the second annular volume 42 and exits the filter assembly 1 from the outlet port 25 on the upper part 22 of the filter cartridge 4. The extracted water droplets agglomerate on the dirty side 34 of the filter medium 30 and then flow between the projections 21 on the filter cartridge 4 into the decantation volume 9. The decantation volume 9 represents a fuel flow "dead zone" meaning that there is substantially no net fuel flow through it. The extracted water migrates to the bottom of the decantation volume 9 due to its density being higher than the density of the fuel, so that fuel is displaced from the decantation volume 9 when it is at capacity.

In this arrangement, the fuel flow is kept separate from the extracted water in the decantation volume 9, meaning that the fuel flow does not come into contact with the extracted water at any stage during filtration. This ensures that the extracted water in the decantation volume 9 is not agitated by the fuel flow, thereby eliminating the possibility of the extracted water being entrained into the fuel flow.

The central support 3 optionally includes a water sensor (not shown) to detect the level of the water in the decantation volume 9 and to signal an operator when the water level reaches a predetermined limit. When the water level reaches the predetermined level, the operator only has to unfasten the locking member 20 from the central support 3 to allow the water to escape from the decantation volume 9. It will be appreciated that other combinations of sensors and/or actuators can also be housed in the central support 3, for example, but not limited to, a clogging sensor, a temperature sensor or a pressure sensor.

The operation which must be performed upon servicing in order to replace the filter medium 30 is relatively simple compared to the operations necessary with conventional removable cartridge filters. All that is required is for the fuel lines to be removed from the inlet and outlet pipes 26, 28 and for the locking member 20 to be unfastened from the central support 3. The central support 3 can then be lifted from the filter body 4, passing through the central opening 14 in the filter head 6, and placed into a new filter body and secured in position by the locking member 20; the old filter body 2, together with the filter cartridge 4, the filter head 6 and the inlet and outlet pipes 26, 28 are then disposed of. As the new filter cartridge 4, filter head 6, inlet pipe 26 and outlet pipe 28 are secured to one another during manufacture, no steps need to be performed during the servicing procedure to secure these parts to one another and to ensure that appropriate seals are formed.

The role of the central support 3, as the primary support component for the filter assembly 1, permits a reduction in the complexity of the other components. For example, the manner in which the central support 3 is secured in position means that no thread inserts are required in the filter cover 6 or the filter bowl 8. Instead, the only thread required is at the bottom of the central support 3 for use with the locking member 20. Furthermore, as any sensors and/or actuators are located within the central support 3, the need for external fixtures, for fixing a heater on a filter body, for example, is removed. The reduction of features on the filter body 2 and the various components 4, 6, 26, 28 secured to it, which would be necessary for the assembly of a conventional removable cartridge filter, reduces the overall cost of manufacture. Therefore, a considerable proportion of the value of the filter assembly 1 is assigned to the central support 3, which is retained during servicing.

A further advantage of the central support 3 is to absorb the net force acting on the filter assembly 1 when pressurised fuel is delivered from the low-pressure transfer pump, thereby improving the robustness of the filter assembly 1 and permitting a lower material specification for the filter body 2, meaning the cost of manufacturing the filter body 2 is further reduced.

The present filter assembly 1, therefore, combines the lower service labour cost of replacing a conventional throwaway filter with the economical advantage of a conventional removable cartridge filter.

The inclusion of the impermeable wall 32 of the filter cartridge 4 is particularly advantageous during servicing as it protects the clean side 40 of the filter medium 30 from contact with the central support 3 when the central support 3 is inserted into the filter body 2, thereby removing any possibility of contamination of a clean filter member. This arrangement therefore provides the stringent cleanliness of a throwaway filter.

It will be appreciated that the above-described filter assembly 1 is not limited for use in a pressurised system having a low-pressure transfer pump located upstream of the filter assembly, and that its advantages over a conventional throwaway filter or removable cartridge filter would still be applicable if it were to be used in a suction system having a lift/transfer pump located downstream of the filter assembly.

It will also be appreciated that the above-described filter assembly 1 is not limited for use with fuel and that it can be used to process other fluids which are required to be filtered and heated such as, for example, a urea solution.

Although particular embodiments of the invention have been disclosed herein in detail, this has been done by way of example and for the purposes of illustration only. The aforementioned embodiments are not intended to be limiting and the invention is defined by the scope of the appended claims.

The invention claimed is:

1. A filter assembly comprising:
   a central support;
   a disposable filter body having a filter cover at its upper end and a filter bowl at its lower end, and an opening provided in each of the filter cover and filter bowl for receiving a respective end of the central support; and
   a disposable filter cartridge, housed within the filter body, and housing a filter member for filtering contaminates from a flow of fluid through the filter assembly, the filter member being arranged for fluid flow in a radial direction from a first side of the filter member to a second side of the filter member, and wherein the disposable filter cartridge further comprises an impermeable wall that extends axially through the filter member adjacent the second side thereof to protect the second side of the filter member during replacement of the disposable filter cartridge;
   wherein the impermeable wall is defined by a hollow cylinder which is axially aligned with the openings provided in the upper and lower ends of the filter body, and the central support extends towards the opening in the lower end of the filter body, through the opening in the upper end of the filter body and through the hollow cylinder of the impermeable wall of the filter cartridge;
   and wherein to disassemble the filter assembly, the central support is removable from the openings of the disposable filter body and the hollow cylinder of the impermeable wall of the filter cartridge to allow separation, disposal and replacement of the filter body and the filter cartridge during servicing.

2. A filter assembly as claimed in claim 1, wherein the filter cover is substantially disc-shaped and is arranged to be mounted to or engaged with the top of the filter bowl.

3. A filter assembly as claimed in claim 1, wherein the filter bowl is substantially bucket-shaped having a cylindrical wall, a bottom side, and an upper aperture to be covered by the filter cover.

4. A filter assembly as claimed in claim 1, wherein the central support is provided with a series of integral heating elements which serve to provide a heating effect to the fluid flow, prior to passage through the filter member.

5. A filter assembly as claimed in claim 1, wherein the central support comprises an elongate stem adapted to be received within at least one of the openings, and an enlarged head of larger diameter than the openings.

6. A filter assembly as claimed in claim 5, wherein in an assembled state the enlarged head of the central support is located outside of the filter body of the filter assembly and in an abutting relationship with either the filter cover or filter bowl; and wherein to disassemble the filter assembly, the disposable filter body and disposable filter cartridge are collectively slid along the elongate stem of the central support in the direction away from the enlarged head to be removed from the central support at the end opposite the enlarged head.

7. A filter assembly as claimed in claim 5, wherein the enlarged head of the central support comprising a housing for electrical connections.

8. A filter assembly as claimed in claim 1, wherein the central support comprises a hollow interior which forms part of a flow passage for fluid through the filter assembly.

9. A filter assembly as claimed in claim 8, wherein the hollow interior of the central support comprises a wall which divides the hollow interior into a first chamber and a second chamber which define a flow passage through the filter assembly.

10. A filter assembly as claimed in claim 9, wherein the fluid enters the first chamber towards an upper end of the central support and exits the second chamber towards the upper end of the central support, prior to passage through the filter member.

11. A filter assembly as claimed in claim 1, wherein the central support is secured to the disposable filter body by a locking member, located, at least partially, within one of the openings.

12. A filter assembly as claimed in claim 11, wherein the locking member comprises a part in screw-threaded engagement with the central support.

13. A filter assembly as claimed in claim 11, wherein the central support comprises an enlarged head at its end remote from the locking member, wherein the enlarged head projects from one of the openings so that the underside thereof abuts the disposable filter body.

14. A filter assembly as claimed in claim 1, wherein the filter cover is further provided with an inlet opening and an outlet opening for allowing fluid to enter and exit the filter body, respectively; and the disposable filter cartridge comprises an inlet port arranged to align with the inlet opening of the filter cover and an outlet port arranged to align with the outlet opening of the filter cover for connecting to a fuel line or pipe for transferring fuel to or from, respectively, the filter assembly.

15. A filter assembly as claimed in claim 14, further comprising an inlet pipe received in the inlet port and the inlet opening of the filter cover to provide a fluid flow path into the filter cartridge, and an outlet pipe received in the outlet port and the outlet opening of the filter cover to provide a fluid flow path out of the filter cartridge, wherein the central support comprises a hollow interior which forms part of a flow passage for fluid through the filter assembly; and wherein the central support is provided with a first radial opening towards its upper end to allow fluid communication between the inlet pipe and the interior, and a second radial opening towards its upper end to allow fluid communication between the interior and an inner volume of the filter body.

16. A filter assembly as claimed in claim 14, wherein the central support comprises an enlarged head; and wherein the radial distance from the central axis of the central support to the radially outermost side of the enlarged head is less than the radial distance from the central axis of the central support to the radially innermost edge of the inlet opening and outlet opening in the filter cover.

* * * * *